United States Patent Office 3,803,263
Patented Apr. 9, 1974

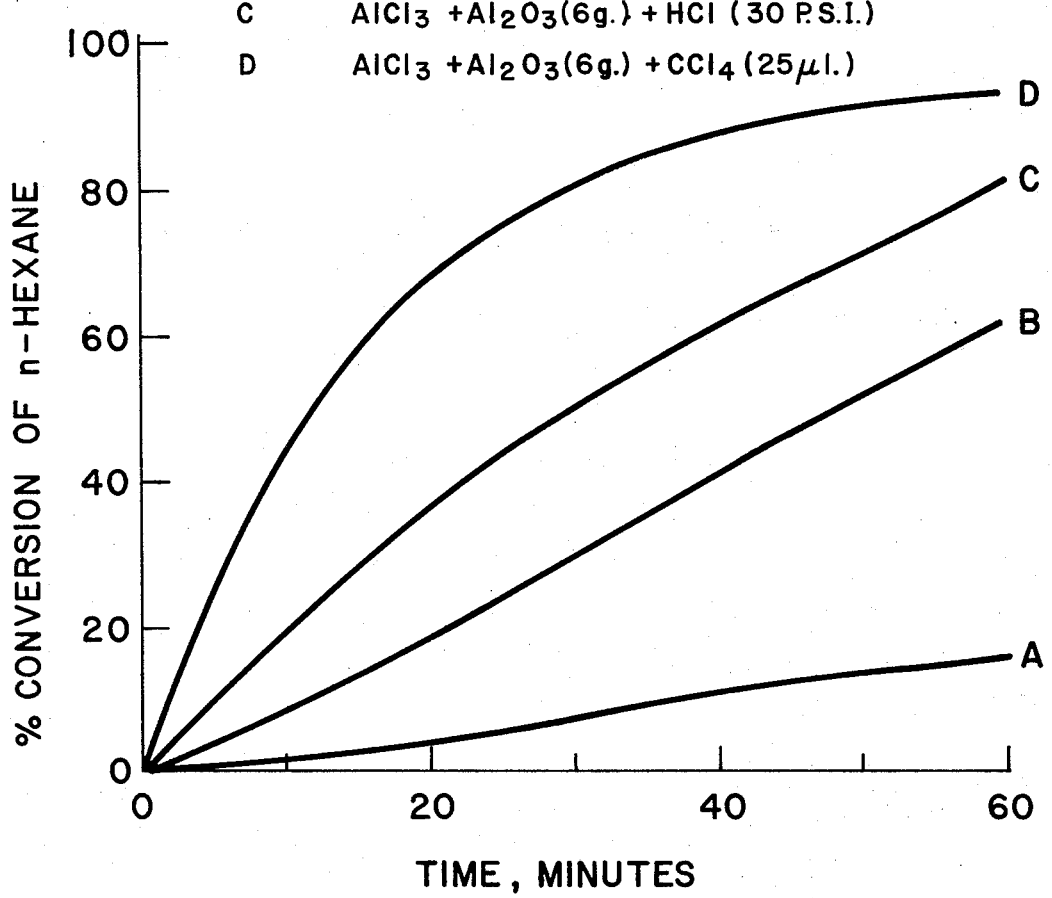

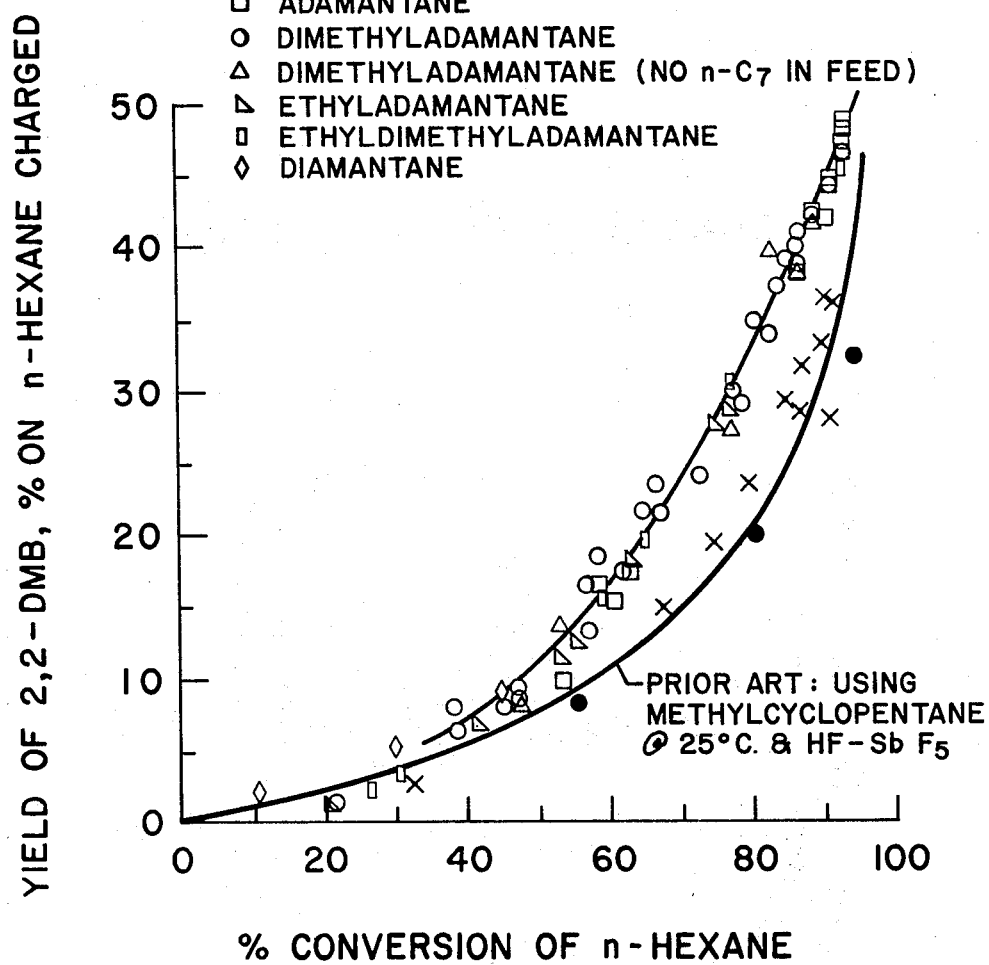

3,803,263
PARAFFIN HYDROCARBON ISOMERIZATION
PROCESS
Abraham Schneider, Overbrook Hills, Pa., and Robert
E. Moore, Wilmington, Del., assignors to Sun Research
and Development Co., Philadelphia, Pa.
Filed Nov. 24, 1972, Ser. No. 309,039
Int. Cl. C07c 5/28
U.S. Cl. 260—683.76
20 Claims

ABSTRACT OF THE DISCLOSURE

Paraffins ranging from $C_6$ to and including solid paraffins are isomerized by contacting the paraffinic feed in liquid phase, preferably at 10–80° C. with an admixture of $AlCl_3$ and a partially dehydrated adsorbent comprising alumina, silica or aluminosilicate having certain pore size and surface area characteristics, in the presence of an adamantanoid suppressor selected from adamantane, alkyladamantanes, diamantane and monoalkyldiamantanes. These adamantanoid suppressors have been found to be highly effective in suppressing undesirable side reactions while allowing the isomerization reaction to proceed. Preferably a minor amount of HCl or saturated halohydrocarbon is also present as a promoter. The combination of $AlCl_3$, the adsorbent and the HCl or halohydrocarbon promoter results in a highly active isomerization catalyst.

CROSS-REFERENCE TO RELATED APPLICATION

Copending application of Abraham Schneider, Ser. No. 309,040, filed of even date herewith and entitled, "Isomerization of Paraffin Hydrocarbons," describes and claims the use of adamantanoid suppressors in isomerizing paraffins by means of powdered $AlCl_3$ in combination with a saturated halohydrocarbon promoter.

BACKGROUND OF THE INVENTION

This invention relates to the isomerization of paraffinic feedstocks by means of an aluminum chloride catalyst at relatively low temperatures. The invention is particularly concerned with the isomerization of paraffins under conditions that provide good isomerization rates while minimizing undesirable side reactions.

There are many disclosures in the prior art relating to the use of aluminum halide catalyst for isomerizing paraffins. The catalyst usually has been used in the form of a preformed aluminum chloride liquid complex which contains excess aluminum chloride dissolved or suspended therein. The liquid complex is contacted with the paraffinic feed as a separate liquid phase to effect isomerization. The effective catalytic component in such case is the excess aluminum chloride in the complex. However there are also numerous references that teach isomerization by means of aluminum halide catalysts in solid form, such as aluminum chloride powder or a combination of aluminum chloride and a carrier material such as alumina.

The main problem in utilizing aluminum chloride catalysts for paraffin isomerizations is to avoid side reactions involving cracking and disproportionation. These reactions tend to destroy the catalytic component due to reaction of the resulting olefinic fragments with aluminum chloride, thereby causing the formation of a complex or sludge which itself is not catalytically active. Besides deactivating the catalyst these reactions reduce the selectivity of the reaction for producing the desired isomerizate product.

In order to suppress side reactions during the aluminum halide isomerization of paraffins the use of naphthenes as suppressors has been proposed in numerous prior art references including the following United States patents:

| Patent No. | Patentee | Issue date |
|---|---|---|
| 2,413,691 | C. C. Crawford et al. | Jan. 7, 1947. |
| 2,434,437 | W. E. Ross | Jan. 13, 1948. |
| 2,438,421 | E. E. Sensel et al. | Mar. 23, 1948. |
| 2,468,746 | B. S. Greensfelder et al. | May 3, 1949. |
| 2,475,358 | R. J. Moore et al. | July 5, 1949. |
| 2,992,285 | F. W. Arey, Jr. et al. | July 11, 1961. |
| 3,280,213 | G. C. Mullen, Jr. et al. | Oct. 18, 1966. |
| 3,285,990 | J. T. Kelly et al. | Nov. 15, 1966. |
| 3,577,479 | D. E. Jost et al. | May 4, 1971. |
| 3,578,725 | do | May 11, 1971. |

The use of naphthenes for this purpose is also discussed by Condon in Catalysis, vol. 6 (1958), pages 82–98, Reinhold Publishing Corp., and in an article by Evening et al. in Ind. Eng. Chem., 45, No. 3, pages 582–589. (1953). While naphthenes in the reaction mixtures will suppress undesirable side reactions at relatively low temperatures, they also tend to suppress the isomerization rates. If the temperature is increased to expedite the isomerization reaction, the naphthenes themselves then become reactive and form carbonium ions. The latter can cause the paraffin to undergo deleterious side reactions. The naphthenic ions also can convert, through loss of protons, to olefinic products which will react with the aluminum chloride to form sludge and destroy the catalyst.

When the paraffinic feed is of the $C_5$–$C_6$ range, naphthenes can be satisfactorily used as suppressors inasmuch as the pentanes and hexanes are not especially prone to undergo cracking and disproportionation reactions. However, when the feed is of the $C_7$ and higher ranger, or even when it is mainly of the $C_5$–$C_6$ range but contains minor amounts of $C_7$ and/or higher paraffins, the use of naphthenes has not provided a satisfactory solution to the side reaction problem, as these higher paraffins are much more prone to crack and/or disproportionate under conditions that otherwise would provide a reasonable isomerization rate. This circumstance was pointed out by Pines et al., Adv. in Pet. Chem. and Ref., II (1960), page 154, and is still applicable to the prior art. Therein the authors state: "Isomerizing heptanes and higher paraffins has met with little practical success [citations]. Although some isomerization occurs, the bulk of reaction is cracking. Inhibitors effective for pentane and hexane isomerization appear to have little effect with the higher alkanes."

Examples of the isomerization of $C_6$ paraffins in the presence of monocyclic naphthenes are given in above-cited Pats. 3,280,213 and 3,285,990. The processes therein described utilize catalysts prepared by reacting an adsorbent such as alumina with $AlCl_3$ at elevated temperature (200–350° F.) and then with gaseous HCl at lower temperature (180–200° F.). While the latter patent mentions heptane as a feed material, no specific example is given wherein heptane was present.

Pats. 2,468,746 and 2,475,358, also cited above, teach the use of naphthenes as suppressors in the isomerization of higher paraffins. In Pat. 2,468,746 the feed is composed of $C_{10}$–$C_{16}$ n-paraffins and the intended isomerization product is diesel fuel, while in Pat. 2,475,358 the feed is solid paraffin wax which is isomerized to yield oil. Both patents disclose that the naphthene suppressor can be monocyclic, dicyclic or tricyclic, and a number of specific examples of such naphthenes is recited including adamantane. The patentees teach, however, that the catalyst cannot be $AlCl_3$ per se, as in the absence of suppressor it will cause extensive cracking while in the presence of sufficient suppressor to inhibit cracking the isomerization reaction will also be repressed. Consequently, the catalyst is required to be modified in the form of a liquid complex containing excess aluminum chloride. Such complex catalyst and hydrocarbons have little mutual solubility and hence would constitute separate phases within the reaction zone. In order for reaction to occur the hydrocarbon reactant has to diffuse into the liquid complex phase and to the sites of excess aluminum chloride, therein, which diffusion necessarily would occur slowly due to the low solubility of paraffin hydrocarbons in the complex. Furthermore, after reaction at the catalyst site has occurred, the resulting isomeric paraffin has to diffuse out of the complex phase to the hydrocarbon phase. The rate of the isomerization reaction is thus limited by mass transfer between the phases. This means that in order to secure reasonable reaction rates intimate mixing of the phases would be required, which necessarily would entail high power costs.

The following United States patents disclose the preparation of isomerization catalysts from a mixture of $AlCl_3$ and partially dehydrated alumina, silica or other adsorbent: Pat. No. 2,208,362, W. F. Engel, July 16, 1940; and Pat. No. 2,351,577, S. B. Thomas, June 13, 1944.

The patents disclose the use of these catalysts for isomerizing butane or pentane in the presence of HCl and in the absence of any naphthene suppressor but do not show their use for isomerizing higher paraffins.

SUMMARY OF THE INVENTION

The present invention provides an improved manner of isomerizing paraffinic hydrocarbons, which is applicable to paraffins ranging from hexane to and including paraffin waxes, and hydrogenated polyethylene. The invention is based on the discovery that, among the many hydrocarbons broadly classifiable as naphthenes, adamantanoid hydrocarbons are unique in their ability to function as suppressors of side reactions during the isomerization. By employing an adamantanoid hydrocarbon suppressor preferably with a halogen-containing promoter as hereinafter described, it has been found that paraffins can be isomerized at good rates and with minimal amounts of side reactions by means of catalyst systems formed by combining $AlCl_3$ with certain kinds of granular adsorbents.

According to the invention, paraffin hydrocarbons are isomerized by means of solid catalyst in a process which comprises:

(a) Establishing a catalyst system consisting essentially of an admixture of aluminum chloride and a partially dehydrated adsorbent comprising alumina, silica or aluminosilicate and having a surface area in the range of 50–300 m.$^2$/g. and an average pore diameter in the range of 30–350 A.;

(b) Contacting the admixture with said paraffinic feed in liquid phase at a temperature in the range of 0–130° C. and in the presence of a suppressor comprising adamantanoid hydrocarbon selected from the group consisting of adamantane, $C_{11}$–$C_{20}$ alkyladamantanes having 1–3 alkyl substituents, diamantane and $C_{15}$–$C_{24}$ monoalkyldiamantane in which the alkyl substituent is attached at a bridgehead position through a primary carbon atom;

(c) Continuing said contacting until substantial isomerization of the paraffinic feed has occurred; and (d) Recovering a paraffinic isomerizate from the reaction mixture. The presence of a halogen-containing promoter, such as hydrogen halide or a saturated hydrocarbyl halide, during the contacting substantially increases the catalyst activity.

BRIEF DESCRIPTION OF THE DRAWINGS

FIG. 1 is a graph showing the conversion of n-hexane with time for various catalyst combinations in the presence of dimethyladamantane as suppressor.

FIG. 2 is a graph showing the relationship between yield of 2,2-dimethylbutane (2,2-DMB) from n-hexane and percent conversion when employing various adamantanoid suppressors as compared with non-adamantanoid naphthenes.

DESCRIPTION

The adamantanoid hydrocarbons employed as suppressors in the present invention include adamantane ($C_{10}$), alkyladamantanes ($C_{11}$–$C_{20}$) which have 1–10 total alkyl carbon atoms constituting 1–3 alkyl substituents, diamantane ($C_{14}$) and monoalkyldiamantanes ($C_{15}$–$C_{24}$) in which the alkyl substituent has 1–10 carbon atoms and is attached through a primary carbon atom to a bridgehead position of the nucleus. The nuclei of adamantane and diamantane can be depicted as follows:

 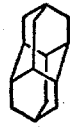

adamantane                  diamantane

As can be seen the adamantane nucleus contains three condensed rings with four bridgehead carbon atoms which are tertiary and equivalent to each other and which are separated from each other by a secondary carbon atom. Diamantane comprises two condensed adamantane nuclei. Unlike the ring systems of non-adamantanoid naphthenes, these structures are unique in that they are incapable of forming an olefinic bond by removal of hydrogen [this being in accordance with Bredt's rule—see "Mechanism and Structure of Organic Chemistry," by Gould (1959), page 348]. The adamantanoid suppressors specified above therefore cannot, in distinction from other kinds of naphthenes, convert under the reaction conditions to olefinic products that can deactivate the aluminum chloride catalyst.

Methods of preparing the adamantanoid hydrocarbons above specified are known in the art. The preparation of adamantane is described, for example, in U.S. Pat. 3,274,274, H. E. Cupery, issued Sept. 20, 1966; and U.S. Pat. 3,489,817, E. C. Capaldi et al., issued Jan. 13, 1970. Numerous references describe the preparation of alkyladamantanes; see, for example, U.S. Pat. 3,128,316, A. Schneider, issued Apr. 7, 1964, and the various references given in U.S. Pat. 3,646,233, R. E. Moore, issued Feb. 29, 1972. The production of diamantane and methyldiamantane is described by T. M. Gund et al., Tetrahedron Letters, No. 4, pp. 3877–3880 (1970) and E. Osawa et al. J. Org. Chem., 36, No. 1, pp. 205–207 (1971). Alkyldiamantanes in which the alkyl group is $C_2$–$C_{10}$ and attached to the nucleus through a primary carbon atom can be made from bromodiamantane by a Grignard type synthesis analogous to that shown in the last-mentioned article for making methyldiamantane.

When alkyladamantanes are used as suppressors in the process of this invention, the suppressor can have one, two or three alkyl substituents on the adamantane nucleus, and it is immaterial whether the substituents are located at bridgehead or non-bridgehead positions or both.

The present process is applicable to a wide range of paraffinic feeds ranging from n-hexane through the gasoline and lubricating oil boiling ranges and including normally solid paraffinic materials such as paraffin waxes and hydrogenated polyethylenes. The feed should be sufficiently free of aromatic and olefinic components so that substantial complexing of the catalyst with such unsaturated components will not occur. The feed can contain monocyclic and dicyclic naphthenes normally associated with the feed paraffins but preferably the content thereof does not exceed 30% by weight. The feed also can contain lower paraffinic material such as pentane.

The process is carried out at a temperature in the range of 0 to 130° C., with temperatures of 10–80° C. usually being preferred. The feed in liquid phase is contacted with a mixture of $AlCl_3$ and the selected adsorbent, preferably in the form of a slurry, at the selected temperature in the presence of an adamantanoid suppressor, as specified above. It is also preferable to include a small amount of halogen-containing promoter in the reaction mixture as more fully described hereinafter. An inert halohydrocarbon solvent, e.g. 1,1,2,2-tetrachloroethane, can also be used in the mixture, but such solvent is essential only when the paraffin feed is normally a solid material at the selected reaction temperature. The slurry is stirred until the desired degree of conversion of the feed to isomerizate has been attained. There is little if any tendency for the catalyst to form sludge and become deactivated, as the presence of the adamantanoid hydrocarbon in the reaction mixture tends to prevent this by immediately combining with any olefinic fragments that may form in small amount due to side reactions, thus preventing their reaction with the aluminum chloride.

After the liquid phase has been contacted with the $AlCl_3$-adsorbent catalyst combination long enough to achieve the desired degree of isomerization, contacting is discontinued and the catalyst is separated from the bulk of the liquid as by filtration or decantation. Substantially no loss in activity of the catalyst is experienced and the catalyst generally is recovered in clean form without discoloration, indicating the absence of complex, unless the reaction is allowed to proceed too close toward the maximum theoretical conversion permitted by thermodynamic equilibrium. The catalyst can be recycled to the isomerization zone for further use. The liquid phase is distilled to separate the paraffinic isomerizate from the adamantanoid material, and from solvent whenever same has been used, and the adamantanoid hydrocarbon and solvent can also be recycled to the isomerization zone for further use.

As a specific illustration of the invention, a mixture of n-hptane (20 ml.), aluminum chloride (4 g.), partially dehydrated gamma alumina (6 g.), 1,3-dimethyladamantane (5 ml.) as suppressor and cyclohexylbromide (50 microliters) as promoter is prepared and the resulting slurry is stirred at 50° C. for 20 minutes. This results in the conversion of the n-heptane to the extent of approximately 90%, of which less than 4% is due to cracking and the rest to isomerization. Essentially no complexing of the catalyst occurs, as indicated by the fact that it remains substantially colorless. During the reaction the bromide moiety of the promoter partly converts to HBr and is partly incorporated through halogen exchange into the aluminum halide. The cyclohexyl group converts to a mixture of cyclohexane and methylcyclopentane. The $C_7$ product contains about 10% n-heptane and 3% triptane, the remainder being singly branched and dibranched heptanes in roughly equal proportions.

For convenience hereinafter certain compounds employed herein as suppressors are sometimes designated by abbreviations as follows:

MCH=methylcyclohexane
Ad=adamantane
DMA=dimethyladamantane
EA=ethyladamantane
EDMA=ethyldimethyladamantane
Dia=diamantane Also for convenience the term "DMB" is used to designate dimethylbutane.

The use of an adsorbent in combination with the $AlCl_3$ and adamantanoid suppressor is an essential feature of the invention. The adsorbent can be alumina, silica or an alumino-silicate, and it must have certain pore size and surface area characteristics to be effective. Furthermore, the adsorbent should be partially dehydrated, preferably to an extent corresponding to any degree of dehydration achieved by heating the adsorbent to a temperature in the range of 200–600° C. and maintaining it at that temperature under atmospheric pressure for, for example, 18 hours. Maximum catalytic activity is generally secured if the adsorbent has been heated at 400–500° C. for such time. Any alumina, silica or aluminosilicate, either naturally occurring or synthetic, that has the necessary pore size and surface area characteristics and has been dehydrated to the extent indicated is useful for the present purpose. These materials include such adsorbents as gamma and eta alumina, bauxite, silica gel, clays such as Attapulgus, montmorillonite and kaolinite, silica-alumina cracking catalysts and the like. Numerous examples of materials from which suitable adsorbents can be selected (after pore size and surface area characteristics have been ascertained) are given in Engel U.S. Pat. 2,208,362 cited above.

For the present purpose the adsorbent should have an average pore diameter in the range of 30–350 A. and a surface area in the range of 50–300 m.$^2$/g. The average pore diameter ($d_p$) is calculated from the surface area (S), as determined by mercury porosimetry [see "Mass Transfer in Heterogeneous Catalysis," by C. N. Satterfield, pages 27–28, MIT Press (1970)] measuring pore diameters down to 30 A., and from the pore volume (V). The latter is measured by nitrogen absorption according to the so-called B.E.T. method (ibid, pages 25–26). The average pore diameter is determined from the equation $d_p = 4$ V/S [see "Introduction to the Principles of Heterogeneous Catalysis," by J. M. Thomas et al., p. 210, Academic Press (1967)]. The importance of having pore diameter and surface area characteristics as above specified is shown by the data in Table I presented hereinafter.

The weight ratio of adsorbent to $AlCl_3$ employed can vary widely, e.g. within the range of 1:5 to 10:1. Preferred adsorbent to $AlCl_3$ ratios are in the range of 1:1 to 5:1.

The use in the reaction mixture of a halogen-containing promoter is not essential for operability but distinctly improves the activity of the catalyst system. The activity tends to increase as the amount of promoter is increased, but the proportion thereof to feed hydrocarbon for securing high activity in any event is small, e.g. in the range of 0.02–2.0% by volume for the halohydrocarbon promoters. The promoter can be HCl, HBr or any saturated chlorohydrocarbon or bromohydrocarbon which is not inert in the presence of the catalyst. Most haloalkanes and halocycloalkanes containing one, two or several chlorine and/or bromine atoms will function as catalyst promoters. Exceptions are 1,1,2,2 - tetrachloroethane, pentachloroethane (except at elevated temperatures such as 75° C. or higher), hexachloroethane and their bromine analogues, which are comparatively inert. The following are examples of halogenated hydrocarbons which are particularly useful as promoters: carbon tetrachloride, chloroform, dichloromethane, dichloroethanes, isopropyl chloride, t-butyl chloride and their bromine analogues. Examples of other compounds which will serve as promoters are the following in which the halogen is chlorine or bromine or both; monohaloethane; 1,2,2,2-tetrahaloethane; 1,3-dihalopropane; 1,2,3,3-tetrahalopropane; 1,2,2,3,3,3-hexahalopropane; n- or sec-butyl halide; monohalodecanes; cyclohexyl halide; 1,3-dihalo-1-methylcyclopentane; monohalodecalins; monohalonorbornanes; perhydroanthracyl halides; haloadamantanes; halodimethyladamantanes; halodiamantanes; etc. Methyl chloride will also function as a promoter although its promoting ability is relatively weak.

The chloroalkanes which are substantially inert and cannot function as promoters, such as symmetrical tetrachloroethane or hexachloroethane, can be employed as inert solvents in the isomerization system whenever a solvent is desired, as when the paraffin feed is normally solid at the reaction temperature. The use of such inert solvents in isomerizations effected by means of aluminum halide catalysts is described in Jost et al. Pats. 3,577,479 and 3,578,725 listed above.

The proportion of the adamantanoid suppressor to paraffin in the reaction mixture can vary widely. Benefits from the presence of the suppressor can be noted, for example, with volume ratios of suppressor to paraffin ranging from 3:97 to 90:10. Optimum proportion ranges will vary depending upon the particular paraffinic components of the feed and may also to some extent depending upon the particular adamantanoid hydrocarbon employed as suppressor. Optimum proportions usually fall within the ranges of 20:80 to 80:20 if the feed contains no naphthenes and 7:93 to 80:20 when such naphthenes are present. By way of example, good results are obtainable for $C_6$ paraffinic feed containing no naphthenes at suppressor: paraffin ratios by volume of 20:80 to 50:50, for $C_7$ paraffin at 50:50 to 75:25, and for $C_8$ and higher paraffins at 60:40 to 80:20. Some of the adamantanoid suppressors, e.g. adamantane, diamantane and their monomethyl derivatives, are normally solid compounds at temperatures suitable for the isomerization. However they have substantial solubilities in liquid paraffinic feeds and are generally usable as suppressors even when no inert solvent is employed in the reaction mixture. In cases where it is desired to utilize suppressor to paraffin ratios higher than that corresponding to the solubility of suppressor in the feed at the selected reaction temperature, an inert halohydrocarbon solvent, as previously specified, can be employed to insure solubilization of the suppressor in the amount desired.

For feedstocks containing $C_7$ or higher paraffins it is beneficial to carry out the reaction in the presence of hydrogen. This is particularly so for $C_8$ and higher paraffins which tend to crack readily. On the other hand, for $C_6$ paraffins, which are not prone to crack, or a $C_6$ feed containing only a small proportion of $C_7$ paraffin, little if any benefit is obtained from the use of $H_2$. When cracking does occur to produce olefinic fragments, the presence of $H_2$ in the reaction zone is beneficial in that the olefinic material tends to react with the $H_2$, and this advantageously prevents it from alkylating the adamantanoid suppressor. Reaction of the olefin with $H_2$ results in the formation of saturate hydrocarbon product that boils below the feed paraffin. Hydrogen can be used typically at partial pressures in the range of 20–500 p.s.i., but optimum results usually are obtained in the range of 100–300 p.s.i. If too much hydrogen pressure is employed, the isomerization rate of the feed paraffin will become undesirably slow.

The adamantanoid material recovered from the reaction mixture can, as previously indicated, be recycled to the reaction zone to serve as the suppressor in isomerizing further quantities of feed paraffin. However, since some minor amount of alkylation of the adamantanoid suppressor by olefinic fragments generally occurs, this material may upon continual use eventually become too highly alkylated to function adequate as suppressor of side reactions. It is therefore desirable to provide distillation means for separating the lower boiling adamantanoid hydrocarbons from the more highly alkylated adamantanoid compounds so that only the former can be recycled. If desired the more highly alkylated compounds can be cracked at 300–450° C. in the presence of a conventional cracking catalyst, such as silica-alumina or crystalline zeolites, to remove $C_3$ and higher alkyl substituents in the form of olefins and yield lower adamantanoid hydrocarbons which can be recycled. Such cracking procedure is described in U.S. Pat. No. 3,707,576, issued Dec. 26, 1972, to R. E. Moore. Alternatively, the more highly alkylated compounds can be catalytically hydrocracked under a hydrogen pressure and other conditions as described in U.S. Pat. 3,489,817 cited above to yield lower adamantanoid hydrocarbons for reuse. Inasmuch as minor losses of adamantanoid material normally will occur in practicing the process, a supply of the adamantanoid suppressor should be provided to make up for any loss incurred.

Utilization of the present process for isomerizing $C_6$ paraffinic stocks to produce isoparaffin components for gasoline provides an unexpected benefit. It has been found that the content of 2,2-dimethylbutane (2,2-DMB) in the $C_6$ isomerizate product is substantially higher, and the content of singly branched hexanes correspondingly lower, than for $C_6$ isomerizates produced by Friedel-Crafts catalysis to the same percent conversion but in the absence of an adamantanoid suppressor. This is illustrated by FIG. 2 which shows the 2,2-DMB content-percent conversion relationship obtained in numerous runs under various conditions as reported below. FIG. 2 also includes a reproduction of a curve showing such relationship as published by Brouwer et al., Div. of Pet. Chem., Am. Chem. Soc., San Francisco Meeting, Apr. 2–5, 1968, pp. 184–192, for a procedure in which n-hexane in the presence of a monocyclic naphthene (methylcyclopentane) and $H_2$ was isomerized by means of HF—$SbF_5$ as catalyst at 25° C. As more fully discussed hereinafter, FIG. 2 shows that the use of an adamantanoid suppressor in combination with the present catalyst system gives distinctly higher 2,2-DMB contents at equivalent conversions. The $C_6$ isomerizate of the present process accordingly has better antiknock quality.

The present process can be utilized for making isoparaffinic gasoline components from saturated feeds of the $C_5$–$C_9$ range containing one or more $C_6$ and higher n-paraffin component. It is especially useful for isomerizing feeds of the $C_6$–$C_8$ range containing one or more straight chain and/or singly branched paraffins and particularly those containing at least some $C_7$ or higher paraffins which ordinarily are highly prone to crack in the presence of Friedel-Crafts catalysts.

Experimental runs for which data are presented hereinafter mostly were carried out in the following manner. The hydrocarbon feed, which was either pure n-hexane or a mixture thereof with 10% n-heptane, was introduced to a reaction tube in amount of 20 ml. together with 4.0 g. of $AlCl_3$. Usually 6.0 g. of the adsorbent, 5 ml. of suppressor and a small amount of halogen-containing promoter were employed, although the amounts of these ingredients were varied for some runs. Whenever HCl was used as the promoter, it was pressured into the reaction tube usually to a partial pressure of 30 p.s.i. at room temperature. The adsorbent had previously been partially dehydrated by heating, usually to 500° C. for 18 hours. These materials were added to the reaction tube under drybox conditions, and the capped tube was then shaken via a wrist shaker in a constant temperature bath. At selected reaction times samples of reaction product were removed by means of a syringe, shaken with aqueous 5% NaOH and then analyzed by GLC.

Several comparative runs on isomerizing n-hexane at 50° C. were made each with 1,3-dimethyladamantane (DMA) as suppressor but varying the components constituting the catalyst system as shown below:

| Catalyst components |
|---|
| Run: |
| A ---------------- $AlCl_3$ (4 g.) plus $CCl_4$ (25 μl.). |
| B ---------------- $AlCl_3$ (4 g.) plus $Al_2O_3$ (6 g.). |
| C ---------------- $AlCl_3$ (4 g.) plus $Al_2O_3$ (6 g.) plus HCl (30 p.s.i.). |
| D ---------------- $AlCl_3$ (4 g.) plus $Al_2O_3$ (6 g.) plus $CCl_4$ (25 μl.). |

One run (Run E) was also made like Run D except that the DMA suppressor was omitted. The $Al_2O_3$ used in Runs B, C, D and E was gamma alumina which had been held at 500° C. under atmospheric pressure for 18 hours. It had an average pore diameter of 136 A. and a surface area of 155 m.$^2$/g. Data for the runs are given in Table I.

TABLE I.—ISOMERIZATION OF n-HEXANE n-Hexane feed, 20 ml.
AlCl₃, 4 g.
DMA, 5 ml. (except Run E)
Temp., 50° C.

| Run number | G. of Al₂O₃ | Promoter (amount) | Reaction time min. | Total conversion | Cracked | Yield of 2,2-DMB |
|---|---|---|---|---|---|---|
| A | 0 | CCl₄ (25 μl.) | 60 | 16.1 | None | 0.7 |
| B | 6 | None | 20 | 18.7 | 0.1 | 0.9 |
|   |   |   | 40 | 41.2 | 0.1 | 5.7 |
|   |   |   | 60 | 62.4 | 0.1 | 15.8 |
| C | 6 | HCl (30 p.s.i.) | 20 | 46.5 | None | 9.3 |
|   |   |   | 40 | 77.9 | None | 31.3 |
|   |   |   | 60 | 90.3 | 0.2 | 44.7 |
| D | 6 | CCl₄ (25 μl.) | 20 | 69.1 | 0.5 | 21.4 |
|   |   |   | 40 | 88.4 | 1.5 | 40.7 |
|   |   |   | 60 | 93.0 | 4.2 | 45.4 |
| E (no DMA) | 6 | CCl₄ (25 μl.) | 20 | 48.2 | 30.8 | 2.1 |
|   |   |   | 40 | 60.5 | 43.7 | 2.6 |
|   |   |   | 60 | 63.9 | 48.0 | 0.3 |

The comparative data in Table I show the importance of having an adsorbent such as alumina along with the AlCl₃ for obtaining good catalytic activity and further show that the activity is considerably enhanced by employing a halogen-containing promoter such as HCl or CCl₄. When no adsorbent was used (Run A) the combination of AlCl₃ and promoter had relatively low catalytic activity. A comparison of Runs C and D with Run B shows that HCl and CCl₄, respectively, distinctly improve the catalytic activity, resulting in high conversion of the n-hexane and high yields of 2,2-DMB. A comparison of Run E with Run D shows that the omission of the adamantanoid suppressor results mainly in cracking rather than isomerization of the n-hexane.

FIG. 1 is a graph showing the relationship, based on the data in Table I for each of Runs A through D, of the total conversion (i.e. isomerization plus cracking) of n-hexane with time of reaction. This chart graphically illustrates the changes in catalytic activity attributable to each component of the catalyst system.

Another series of runs was made on isomerizing n-hexane at 50° C. utilizing various adsorbent materials to prepare the catalyst system. In each case the adsorbent had been heated in an inert atmosphere to 500° C. and maintained at that temperature for 18 hours. The promoter employed was HCl (30 p.s.i.), the suppressor was DMA, and the proportions of reaction mixture components were as specified above. Conversion results are given in Table II, with the runs being listed in the order of increasing average pore diameter of the adsorbent.

TABLE II.—USE OF VARIOUS ADSORBENTS IN ISOMERIZING n-HEXANE n-Hexane feed, 20 ml.
AlCl₃, 4 g.
Adsorbent, 6 g. (calcined at 500° C. for 18 hours)
HCl, 30 p.s.i.
DMA, 5 ml.
Temp., 50° C.

| Run No. | Adsorbent | Average pore diameter, A | Surface area, m²/g. | Percent conversion of n-hexane 40 min. | 60 min. |
|---|---|---|---|---|---|
| 1 | Activated carbon | 4 | 416 | 5 | 8 |
| 2 | Silica | 4 | 688 | 22 | 35 |
| 3 | Type A calcium zeolite | 5 | 450 | 5 | 10 |
| 4 | Type Y rare earth zeolite | 7 | 548 | 15 | 24 |
| 5 | Silica-alumina cracking catalyst | 34 | 188 | 34 | 51 |
| 6 | Acid-activated montmorillonite clay | 50 | 215 | 71 | 88 |
| 7 | Steamed silica-alumina cracking catalyst | 54 | 128 | 51 | 69 |
| 8 | Calcined Al(OH)₃ | 62 | 156 | ---- | 89 |
| 9 | Bauxite | 66 | 154 | 35 | 58 |
| 10 | Type Y rare earth zeolite in silica-alumina | 80 | 170 | 80 | 91 |
| 11 | Gamma alumina (#1) | 82 | 227 | 88 | 93 |
| 12 | Eta alumina | 94 | 151 | 85 | 92 |
| 13 | Extruded silica | 114 | 276 | 70 | 86 |
| 14 | Gamma alumina (#2) | 136 | 155 | 83 | 91 |
| 15 | Gamma alumina (#3) | 162 | 245 | 82 | 91 |
| 16 | Attapulgus clay | 222 | 106 | 37 | 65 |
| 17 | Pumice | 440 | 2 | 17 | 25 |

From the data in Table II it can be seen that numerous materials containing alumina, silica or alumino-silicates can be used to make active catalysts. The data show that for substantial activity the catalyst system should be made utilizing an adsorbent with average pore diameter in the range of 30–350 A. and surface area in the range of 50–300 m.²/g.

A series of runs was made to determine the effect of different degrees of calcining of the adsorbent. The adsorbent for each run was gamma alumina which had been calcined for 18 hours, with different calcining temperatures being employed among the runs. The feed was n-hexane and isomerization conditions were as described above. Results are shown in Table III.

TABLE III.—ISOMERIZATION OF n-HEXANE—EFFECT OF DEGREE OF CALCINING ABSORBENT n-hexane feed, 20 ml.
AlCl₃, 4 g.
Al₂O₃, 6 g. (18 hours calcination at various temperatures)
HCl: 30 p.s.i.
DMA, 5 ml.
Temp., 50° C.

| Run number | Calcination temp., of Al₂O₃ | Reaction time, min. | Total conversion | Cracked | Yield of 2,2-DMB |
|---|---|---|---|---|---|
| 18 | 200 | 20 | 47.9 | 0.3 | 9.5 |
|    |     | 40 | 78.8 | 0.8 | 31.9 |
|    |     | 60 | 90.2 | 1.0 | 43.8 |
| 19 | 400 | 20 | 59.2 | 0.2 | 13.8 |
|    |     | 40 | 83.7 | 0.5 | 34.0 |
|    |     | 60 | 91.6 | 1.0 | 44.2 |
| 20 | 500 | 20 | 59.0 | 0.2 | 16.9 |
|    |     | 40 | 85.0 | 0.9 | 37.5 |
|    |     | 60 | 91.4 | 1.3 | 44.3 |
| 21 | 600 | 20 | 54.0 | 0.2 | 9.8 |
|    |     | 40 | 79.0 | 0.5 | 28.4 |
|    |     | 60 | 89.7 | 1.1 | 39.6 |
| 22 | 685 | 20 | 46.1 | 0.2 | 6.5 |
|    |     | 40 | 74.3 | 0.4 | 22.4 |
|    |     | 60 | 84.9 | 0.6 | 34.1 |
| 23 | 735 | 20 | 50.8 | 0.1 | 5.0 |
|    |     | 40 | 67.8 | 0.2 | 17.2 |
|    |     | 60 | 77.2 | 0.3 | 25.4 |
| 24 | 1,000 | 20 | 28.4 | 0.1 | 2.5 |
|    |     | 40 | 48.1 | 0.1 | 7.4 |
|    |     | 60 | 62.8 | 0.3 | 14.4 |

The data in Table III show that good results are obtained by utilizing alumina which has been partially dehydrated by heating to a temperature in the range of 200–600° C. for 18 hours, with optimum results being obtained when the temperature is in the neighborhood of 400–500° C.

In another series of runs various proportions of $Al_2O_3$ (gamma) to $AlCl_3$ were used in the isomerization of a 90:10 (by volume) feed mixture of n-hexane and n-heptane. The $Al_2O_3$ had been calcined at 500° C. for 18 hours, and reaction conditions otherwise were as previously described. Results are shown in Table IV.

TABLE IV.—ISOMERIZATION OF $C_6$-$C_7$ FEED—EFFECT OF $Al_2O_3$ TO $AlCl_3$ RATIO

Feed, 18 ml. n-$C_6$ plus 2 ml. n-$C_7$
$AlCl_3$, 4 g.
$Al_2O_3$, varied
HCl, 30 p.s.i.
DMA, 5 ml.
Temp., 50° C.

| Run number | $Al_2O_3$:$AlCl_3$ ratio | Reaction time, min. | Percent Total conversion | Percent Cracked | Yield of 2,2-DMB, percent on n-$C_6$ in feed |
|---|---|---|---|---|---|
| 25 | 1:2 | 20 | 34.2 | 0.1 | 3.1 |
|  |  | 40 | 61.2 | 0.2 | 14.4 |
|  |  | 60 | 79.6 | 0.5 | 29.9 |
| 26 | 3:2 | 15 | 46.1 | 0.1 | 7.2 |
|  |  | 30 | 79.6 | 0.8 | 30.6 |
|  |  | 45 | 91.6 | 1.7 | 45.2 |
| 27 | 3:1 | 15 | 50.6 | 0.2 | 8.5 |
|  |  | 30 | 85.8 | 1.0 | 36.8 |
|  |  | 45 | 93.7 | 2.7 | 50.3 |

The results given in Table IV show that the activity of the catalyst increases as the $Al_2O_3$:$AlCl_3$ weight ratio increases in the range tested. They further show that use of the present invention employing an adamatanoid suppressor (DMA) allows n-hexane containing a significant amount of n-heptane to be isomerized practically to equilibrium without an excessive amount of cracking occuring. It is noteworthy that in Run 27 about 50% of the n-hexane was converted to the 2,2-DMB isomer.

Table V shows that a feed consisting of n-heptane can be isomerized by the present process to secure high conversion without an inordinate amount of cracking as experienced in prior art procedures.

TABLE V.—ISOMERIZATION OF n-HEPTANE

Feed, 20 ml. n-heptane
$AlCl_3$, 4 g.
$Al_2O_3$, 6 g. (calcined at 500° C. for 18 hours)
HCl, 15 p.s.i.
DMA, varied

| Run number | Amount of DMA, ml. | Reaction temp., °C. | Reaction time, min. | Percent Conversion | Percent Cracked |
|---|---|---|---|---|---|
| 28 | 5 | 23 | 60 | 45.2 | 0.1 |
| 29 | 10 | 23 | 60 | 26.5 | 0.1 |
| 30 | 2 | 30 | 20 | 38.5 | 0.1 |
|  |  |  | 40 | 72.6 | 0.6 |
|  |  |  | 60 | 92.6 | 13.8 |
| 31 | 5 | 30 | 20 | 29.1 | 0.1 |
|  |  |  | 40 | 59.5 | 0.3 |
|  |  |  | 60 | 78.1 | 0.9 |
| 32 | 10 | 50 | 10 | 56.5 | 0.4 |
|  |  |  | 20 | ¹ 89.9 | 3.4 |
|  |  |  | 30 | 94.4 | 7.4 |

¹ $C_7$ product contained about 10% n-heptane, 3% triptane and 87% of about equal parts of singly branched and dibranched heptanes.

A series of runs was made on isomerizing n-hexane utilizing various halogen-containing promoters and otherwise with conditions as previously described. The activities of the resulting catalyst systems, as indicated by the percent total conversion at 60 minutes reaction time, are shown in Table IV. The table also includes data from Runs B, C and D (Table I) for comparison.

TABLE VI.—ISOMERIZATION OF n-HEXANE—EFFECT OF VARIOUS PROMOTERS

Feed, 20 ml. n-hexane
$AlCl_3$, 4 g.
$Al_2O_3$, 6 g.
DMA, 5 ml.
Promoter, as noted
Temperature, 50° C.

| Run number | Promoter (amount) | Approximate percent total conversion at 60 min. |
|---|---|---|
| B | None | 62 |
| 33 | 1,1,2,2-tetrachloroethane (25 μl.) | 60 |
| 34 | HCl (15 p.s.i.) | 89 |
| C | HCl (30 p.s.i.) | 90 |
| 35 | $CCl_4$ (10 μl.) | 86 |
| 36 | $CCl_4$ (15 μl.) | 92 |
| D | $CCl_4$ (25 μl.) | 93 |
| 37 | $CH_2Cl_2$ (25 μl.) | 83 |
| 38 | 1-BromoDMA (25 μl.) | 85 |
| 39 | i-Propylchloride (25 μl.) | 85 |
| 40 | t-Butylchloride (25 μl.) | 88 |
| 41 | $CHCl_3$ (25 μl.) | 92 |
| 42 | 1,1-dichloroethane (25 μl.) | 92 |

The data used for constructing FIG. 2 were obtained in a series of runs employing various adamantanoid suppressors and, for comparison, methylcyclohexane (MCH) and also no suppressor in one run. Specifically the adamantanoid suppressors utilized were Ad, Dia and the alkyladamantanes DMA, EA and EDMA wherein the alkyl substituents were located at bridgehead positions. In most of these runs the feed (20 ml.) was a mixture of 90% n-hexane and 10% n-heptane by volume, although some runs were included in which the feed was 100% n-hexane. In these runs $Al_2O_3$ (6 g.) which had been heated to 500° C. was used together with $AlCl_3$ (usually 4 g.), the promoter was HCl (30 p.s.i.) and the reaction was run at 50° C. Data for these runs are presented in Tables VII (DMA), VIII (other adamantanoids) and IX (MCH), and the yields of 2,2-DMB (based on $C_6$ charged) are plotted against percent conversion of n-hexane in FIG. 2. Table IX and FIG. 2 also include one run (Run 71) made without any suppressor and with a feed containing no n-heptane so as to avoid excessive cracking.

TABLE VII.—ISOMERIZATION OF $C_6$-$C_7$ MIXTURE AT 5° C. IN PRESENCE OF DMA

| Run number | Ml. of DMA | Reaction time, min. | Percent of total feed cracked | Percent conversion of n-$C_6$ | Yield of 2,2-DMB, percent on n-$C_6$ in feed |
|---|---|---|---|---|---|
| 43 | 5 | 20 | 0.3 | 56.9 | 13.4 |
|  |  | 40 | 1.3 | 87.2 | 41.2 |
|  |  | 60 | 4.0 | 93.0 | 46.7 |
| 44 ¹ | 5 | 20 | nil | 52.5 | 13.8 |
|  |  | 40 | nil | 83.1 | 39.8 |
|  |  | 60 | 0.3 | 88.9 | 41.9 |
| 45 | 10 | 20 | 0.2 | 56.6 | 16.6 |
|  |  | 40 | 0.9 | 84.0 | 37.1 |
|  |  | 60 | 1.3 | 90.8 | 44.1 |
| 46 | 10 | 20 | 0.1 | 47.0 | 8.6 |
|  |  | 40 | 0.6 | 78.3 | 29.0 |
|  |  | 60 | 1.0 | 86.9 | 40.2 |
| 47 ¹ | 10 | 20 | 0.1 | 46.7 | 8.1 |
|  |  | 40 | 0.2 | 76.5 | 27.1 |
|  |  | 60 | 0.2 | 86.4 | 38.1 |
| 48 | 15 | 30 | 0.4 | 64.5 | 21.9 |
|  |  | 60 | 1.1 | 88.6 | 42.3 |
| 49 | 20 | 30 | 0.3 | 58.2 | 18.5 |
|  |  | 60 | 0.9 | 85.1 | 39.1 |
| 50 | 20 | 20 | 0.2 | 45.3 | 8.1 |
|  |  | 40 | 0.7 | 72.6 | 24.2 |
|  |  | 60 | 0.9 | 82.7 | 34.0 |
| 51 | 20 | 60 | 0.7 | 87.1 | 38.8 |
| 52 | 25 | 20 | 0.1 | 38.0 | 8.0 |
|  |  | 40 | 0.6 | 66.4 | 23.5 |
|  |  | 60 | 0.7 | 80.1 | 35.0 |
| 53 | 30 | 20 | 0.3 | 38.3 | 6.3 |
|  |  | 40 | 0.4 | 62.3 | 17.5 |
|  |  | 60 | 0.8 | 67.4 | 21.7 |
| 54 | 35 | 20 | 0.2 | 21.9 | 1.5 |
|  |  | 40 | 0.5 | 47.0 | 9.2 |
|  |  | 60 | 0.8 | 67.4 | 21.7 |
|  |  | 90 | 1.0 | 77.5 | 29.8 |

¹ 100% n-$C_6$.
NOTE.—The feed in all runs except 44 and 47 was composed of 18 ml. n-hexane and 2 ml. of n-heptane.

TABLE VIII.—Isomerization of $C_6$-$C_7$ Mixture in Presence of Various Adamantanoids Feed, 18 ml. n-hexane plus 2 ml. n-heptane
Temp., 50° C.

| Run number | Suppressor (amount) | Reaction time, min. | Percent of total feed cracked | Percent conversion of n-$C_6$ | Yield of 2,2-DMB percent on n-$C_6$ in feed |
|---|---|---|---|---|---|
| 55 | Adamantane (1.0 g.) | 20 | 0.2 | 63.0 | 17.4 |
|  |  | 40 | 2.3 | 93.0 | 46.5 |
| 56 | Adamantane (2.0 g.) | 20 | 0.1 | 60.5 | 15.3 |
|  |  | 45 | 0.8 | 89.2 | 42.6 |
|  |  | 60 | 1.7 | 93.2 | 47.2 |
| 57 | Adamantane (3.0 g.) | 40 | 1.0 | 91.6 | 44.9 |
|  |  | 60 | 1.7 | 93.7 | 48.9 |
| 58 | Adamantane (5.0 g.) | 20 | 0.5 | 58.1 | 16.7 |
|  |  | 40 | 1.1 | 91.2 | 44.5 |
|  |  | 60 | 1.9 | 93.7 | 48.4 |
| 59 | Adamantane (7.5 g.) | 20 | 0.2 | 53.6 | 9.9 |
|  |  | 40 | 0.7 | 86.6 | 38.3 |
|  |  | 60 | 1.8 | 91.1 | 42.1 |
| 60 | Diamantane (1.0 g.) | 20 | Nil | 10.5 | 2.2 |
|  |  | 40 | 0.1 | 30.0 | 5.2 |
|  |  | 60 | 0.2 | 45.5 | 9.0 |
| 61 | EA (2 ml.) | 45 | 0.1 | 54.9 | 12.7 |
|  |  | 60 | 0.7 | 76.3 | 28.4 |
| 62 | EA (5 ml.) | 20 | 0.1 | 20.5 | 1.3 |
|  |  | 40 | 0.1 | 52.8 | 11.3 |
|  |  | 60 | 0.3 | 75.5 | 27.7 |
| 63 | EA (10 ml.) | 40 | Nil | 41.6 | 6.8 |
|  |  | 60 | Nil | 63.0 | 17.8 |
| 64 | EDMA (5 ml.) | 20 | 0.1 | 30.8 | 3.3 |
|  |  | 40 | 0.4 | 64.6 | 19.3 |
|  |  | 60 | 9.4 | 92.3 | 45.2 |
| 65 | EDMA (10 ml.) | 20 | 0.1 | 26.3 | 2.3 |
|  |  | 40 | 0.2 | 58.3 | 15.8 |
|  |  | 60 | 0.6 | 76.9 | 30.6 |

TABLE IX.—COMPARATIVE RUNS

Isomerizations in Absence of adamantanoid suppressor

Amount of feed, 20 ml.
Temp., 50° C.

| Run number | Feed | Suppressor (amount) | Reaction time, min. | Percent of total feed cracked | Percent conversion of n-$C_6$ | Yield of 2,2-DMB, percent on n-$C_6$ in feed |
|---|---|---|---|---|---|---|
| 66 | 90% n-$C_6$, 10% n-$C_7$ | MCH (2 ml.) | 20 | 2.7 | 80.0 | 23.8 |
|  |  |  | 40 | 6.2 | 89.9 | 33.4 |
|  |  |  | 60 | 8.4 | 91.1 | 36.3 |
| 67 | 90% n-$C_6$, 10% n-$C_7$ | MCH (2 ml.) | 20 | 1.3 | 67.4 | 15.0 |
|  |  |  | 40 | 9.1 | 87.1 | 28.2 |
|  |  |  | 60 | 19.4 | 90.8 | 28.0 |
| 68 | 90% n-$C_6$, 10% n-$C_7$ | MCH (3 ml.) | 40 | 4.6 | 87.4 | 32.0 |
|  |  |  | 60 | 6.6 | 90.8 | 36.2 |
| 69 | 90% n-$C_6$, 10% n-$C_7$ | MCH (5 ml.) | 20 | 0.2 | 33.5 | 2.9 |
|  |  |  | 40 | 5.0 | 75.0 | 19.2 |
|  |  |  | 60 | 8.3 | 84.7 | 29.2 |
| 70 | 90% n-$C_6$, 10% n-$C_7$ | None | 20 | 63.0 | 95.5 | 4.9 |
| 71 | 100% n-$C_6$ | do | 20 | Nil | 55.7 | 8.2 |
|  |  |  | 40 | Nil | 80.5 | 20.0 |
|  |  |  | 60 | 25.1 | 94.1 | 32.5 |

In FIG. 2 the percent 2,2-DMB vs. percent conversion relationships derived from the runs of Tables VII, VIII and IX are indicated by the numerous points plotted. The upper curve shown represents such relationship for the runs employing the various adamantanoid suppressors. The points obtained for the runs of Table IX employing either MCH as the suppressor or no suppressor (designated respectively by crosses and dots) fall considerably below the adamantanoid curve and near the lower curve shown. The latter is a reproduction of the curve shown in the aforesaid article by Brouwer et al. wherein n-hexane in the presence of methylcyclopentane and hydrogen was isomerized at 25° C. by means of HF—SbF$_4$. FIG. 2 thus demonstrates that for any selected degree of conversion of n-hexane a distinctly higher yield of the 2,2-DMB isomer is obtained when an adamantanoid suppressor is used than when a conventional naphthene suppressor or no suppressor is employed.

The data in Tables VII–IX also show that the various adamantanoid hydrocarbons are markedly better than the nonadamantanoid suppressor in allowing the isomerization reaction to proceed to high conversion while still suppressing cracking.

A light straight run naphtha substantially free of unsaturated hydrocarbons and mainly of the $C_5$–$C_7$ range was isomerized for one hour under the conditions previously described (same as in Run C), except that the amount of DMA used as suppressor was 2 ml. (10% by volume based on naphtha feed). The feed contained a total of 14.2% monocyclic naphthenes having 5–7 carbon atoms. Compositions of the feed and product are given in Table X on a suppressor-free basis.

TABLE X.—ISOMERIZATION OF LIGHT STRAIGHT RUN NAPHTHA

Naphtha feed, 20 ml.
AlCl$_3$, 4 g.
Al$_2$O$_3$, 6 g. (calcined at 500° C. for 18 hours)
HCl, 30 p.s.i.
DMA, 2 ml.
Temp., 50° C.

| | Composition, wt. percent | |
|---|---|---|
| | Feed | Product |
| $C_4$ paraffins | 4.5 | 7.6 |
| $C_5$ paraffins: | | |
| i-$C_5$ | 17.3 | 32.6 |
| n-$C_5$ | 26.1 | 10.8 |
| Total | 43.4 | 43.4 |
| $C_6$ paraffins: | | |
| 2,2-DMB | 1.4 | 14.4 |
| 2,3-DMB | 1.5 | 2.4 |
| 2-MP | 10.1 | 7.8 |
| 3-MP | 5.0 | 3.6 |
| n-$C_6$ | 12.1 | 2.1 |
| Total | 30.1 | 30.3 |
| $C_7$ paraffins | 6.9 | 6.9 |
| $C_8$ paraffins | 0.8 | 0.1 |
| Total naphthenes | 14.2 | 11.8 |

The data in Table X show that naphthas composed of paraffins and the usual amounts of associated naphthenes and containing substantial amounts of paraffins boiling above the $C_6$ range can be effectively isomerized by the process of the present invention. A comparison of the amounts of $C_4$ components in the feed and product in this case shows that little cracking occurred. Calculations from the results of this run and known equilibrium values at 50° C. indicate that the $C_5$'s, $C_6$'s and $C_7$'s were isomerized, respectively, to about 89%, 98% and 99% of equilibrium.

When other adamantanoid hydrocarbons as herein specified are used as suppressors in place of those employed in the foregoing examples, substantially similar results are obtained although differences in suppressing action may be noted for different adamantanoid compounds. The degree of suppression under a given set of reaction conditions generally tends to decrease as the degree of alkylation of the adamantanoid nucleus increases. This can be seen, for example, by comparing Run 64, wherein the suppressor (EDMA) contained three bridgehead alkyl substituents, with Run 62 wherein it (EA) contained only one bridgehead alkyl group. Thus adamantane and diamantane usually exhibit the strongest suppressing actions, so that lower amounts of these in solution generally will exert equivalent suppressing actions to higher amounts of alkyladamantanes. However, for convenience in material handling in the present process, it can be preferable to employ a normally liquid suppressor, such as DMA, rather than one that is normally solid such as admantane and diamantane and to utilize a somewhat larger proportion of the normally liquid suppressor in order to obtain an equivalent suppression action. Suppressors generally preferred are the $C_{11}$–$C_{14}$ alkyladamantanes having 1–3 alkyl substituents of the $C_1$–$C_2$ range, examples being methyladamantane, dimethyladamantane, ethyladamantaine, methylethyladamantane, trimethyladamantane and mixtures of two or more of same. to avoid a bromine-chlorine interchange reaction with the When other non-inert saturated chlorohydrocarbons or bromohydrocarbons, as previously described, are used in place of the alkyl chlorides shown in the foregoing examples as promoters, substantially analogous results are obtained. It is generally preferable, however, to use a chlorohydrocarbon rather than a bromohydrocarbon in order to avoid a brominechlorine interchange reaction with the $AlCl_3$.

The invention claimed is:

1. Process for isomerizing a paraffinic feed containing one or more paraffin hydrocarbons having at least six carbon atoms per molecule and substantially free of unsaturated hydrocarbons, which comprises:
    (a) establishing a catalyst system consisting essentially of an admixture of aluminum chloride and a partially dehydrated adsorbent comprising alumina, silica or alumino-silicate and having a surface area in the range of 50–300 m.²/g. and an average pore diameter in the range of 30–350 A.;
    (b) contacting the admixture with said paraffinic feed in liquid phase at a temperature in the range of 0–130° C. and in the presence of a suppressor comprising adamantanoid hydrocarbon selected from the group consisting of adamantane, $C_{11}$–$C_{20}$ alkyladamantanes having 1–3 alkyl substituents, diamantane and $C_{15}$–$C_{24}$ monoalkyldiamantane in which the alkyl substituent is attached at a bridgehead position through a primary carbon atom;
    (c) continuing said contacting until substantial isomerization of the paraffinic feed has occurred;
    (d) and recovering a paraffinic isomerizate from the reaction mixture.

2. Process according to claim 1 wherein said contacting is also carried out in the presence of a minor amount of a halogen-containing promoter selected from HCl, HBr and saturated halohydrocarbon promoters in which the halogen is chlorine or bromine.

3. Process according to claim 2 wherein said suppressor is $C_{11}$–$C_{14}$ alkyladamantane having 1–3 alkyl substituents of the $C_1$–$C_2$ range.

4. Process according to claim 3 wherein said suppressor is dimethyladamantane.

5. Process according to claim 2 wherein said suppressor is adamantane.

6. Process according to claim 2 wherein said promoter is selected from HCl, carbon tetrachloride, chloroform, dichloromethane, dichloroethane, isopropyl chloride and t-butyl chloride.

7. Process according to claim 6 wherein said suppressor is $C_{11}$–$C_{14}$ alkyladamantane having 1–3 alkyl substituents of the $C_1$–$C_2$ range.

8. Process according to claim 7 wherein said suppressor is dimethyladamantane.

9. Process according to claim 6 wherein said suppressor is adamantane.

10. Process according to claim 2 wherein said feed mainly comprises one or more paraffins of the $C_6$–$C_8$ range which are straight chain or singly branched, said temperature is in the range of 10–80° C., said promoter is HCl or a saturated hydrocarbyl chloride, and said suppressor is adamantane, methyladamantane, dimethyladamantane, ethyladamantane, methylethyladamantane, trimethyladamantane, ethyldimethyladamantane or a mixture of two or more of same.

11. Process according to claim 10 wherein said adsorbent is alumina which has been dehydrated at a temperature in the range of 200–600° C.

12. Process according to claim 11 wherein said promoter is carbon tetrachloride.

13. Process according to claim 12 wherein said adsorbent is alumina which has been dehydrated at a temperature in the range of 200–600° C.

14. Process according to claim 13 wherein said suppressor is adamantane, methyladamantane, dimethyladamantane, ethyladamantane, methylethyladamantane, trimethyladamantane, ethyldimethyladamantne or a mixture of two or more of same.

15. Process according to claim 14 wherein said promoter is selected from HCl, carbon tetrachloride, chloroform, dichloromethane, dichloroethane, isopropyl chloride and t-butyl chloride.

16. Process for isomerizing $C_6$ paraffin hydrocarbons which comprises:
    (a) establishing a hydrocarbon mixture substantially free of unsaturated hydrocarbons and containing essentially (1) $C_6$ paraffin having less than two branches and (2) an adamantanoid hydrocarbon suppressor selected from the group consisting of adamantane, $C_{11}$–$C_{20}$ alkyladamantanes having 1–3 alkyl substituents, diamantane and $C_{15}$–$C_{24}$ monoalkyldiamantane in which the alkyl substituent is attached at a bridgehead position through a primary carbon atom, the volume ratio of said adamantanoid hydrocarbon suppressor to $C_6$ paraffin being in the range of 3:97 to 90:10;
    (b) contacting said mixture under isomerizing conditions with a catalyst system at a temperature in the range of 0 to 130° C. in the presence of a minor amount of HCl, HBr or saturated halohydrocarbon promoter in which the halogen is chlorine or bromine, said catalyst system consisting essentially of an admixture of aluminum chloride and a partially dehydrated adsorbent comprising alumina, silica or aluminosilicate and having a surface area in the range of 50–300 m.²/g. and an average pore diameter in the range of 30–350 A.;
    (c) and recovering from the reaction mixture a $C_6$ paraffinic isomerizate containing 2,2-dimethylbutane.

17

17. Process according to claim 16 wherein said volume ratio of suppressor to $C_6$ paraffin is in the range of 7:93 to 80:20.

18. Process according to claim 17 wherein said temperature is in the range of 10–80° C. and said suppressor is adamantane, methyladamantane, dimethyladamantane, ethyladamantane, methylethyladamantane, trimethyladamantane, ethyldimethyladamantane or a mixture of two or more of same.

19. Process according to claim 18 wherein said adsorbent is alumina which has been dehydrated to a temperature in the range of 200–600° C.

18

20. Process according to claim 19 wherein the weight ratio of alumina to $AlCl_3$ is in the range of 1:1 to 5:1.

References Cited

UNITED STATES PATENTS 3,523,072  8/1970  Schneider _____ 260—683.76

DELBERT E. GANTZ, Primary Examiner

G. J. CRASANAKIS, Assistant Examiner